June 2, 1959 P. Z. ANTHONY ET AL 2,889,364
PROCESS FOR PRODUCING THYROXINE
Filed May 3, 1957 3 Sheets-Sheet 2

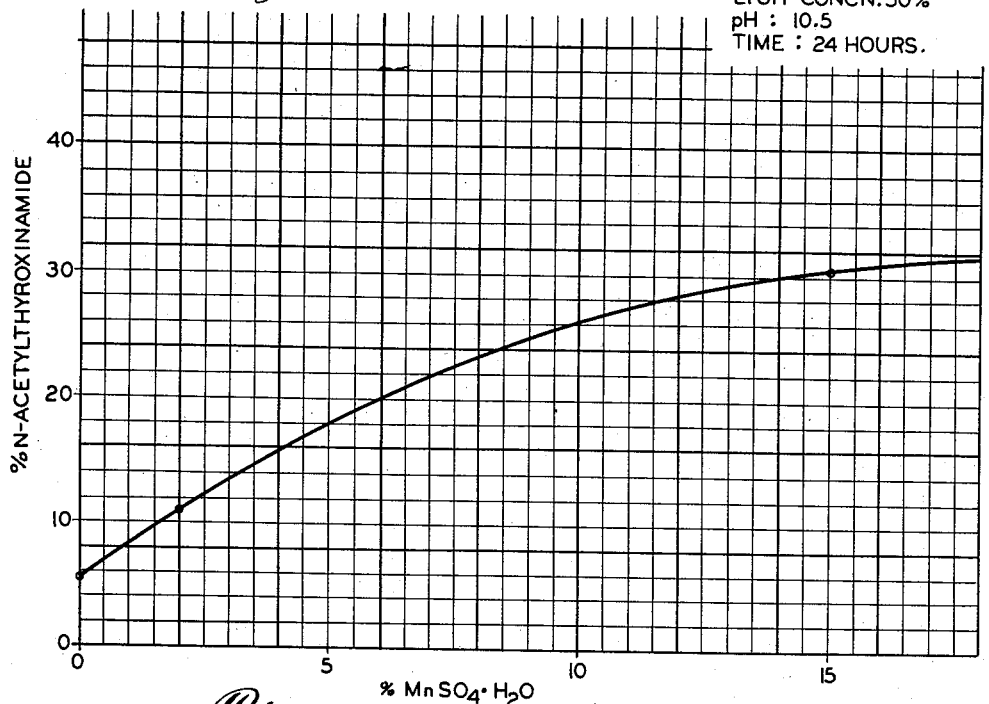
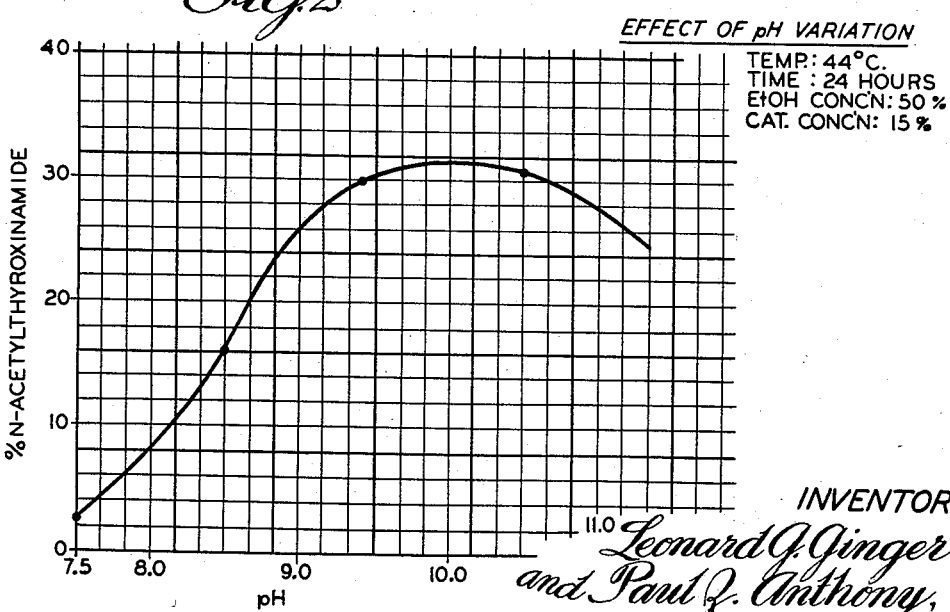

EFFECT OF EtOH CONC'N.
TEMP.: 44°C.
CAT. CONC'N.: 15%
pH: 10.5
TIME: 24 HOURS

EFFECT OF TEMPERATURE
pH: 10.5
CAT. CONC'N.: 15%
EtOH CONC'N.: 50%
TIME: 24 HOURS

INVENTORS:
Leonard G. Ginger
and Paul Z. Anthony,
BY Dawson, Tilton, Fallon & Lungmus,
ATTORNEYS.

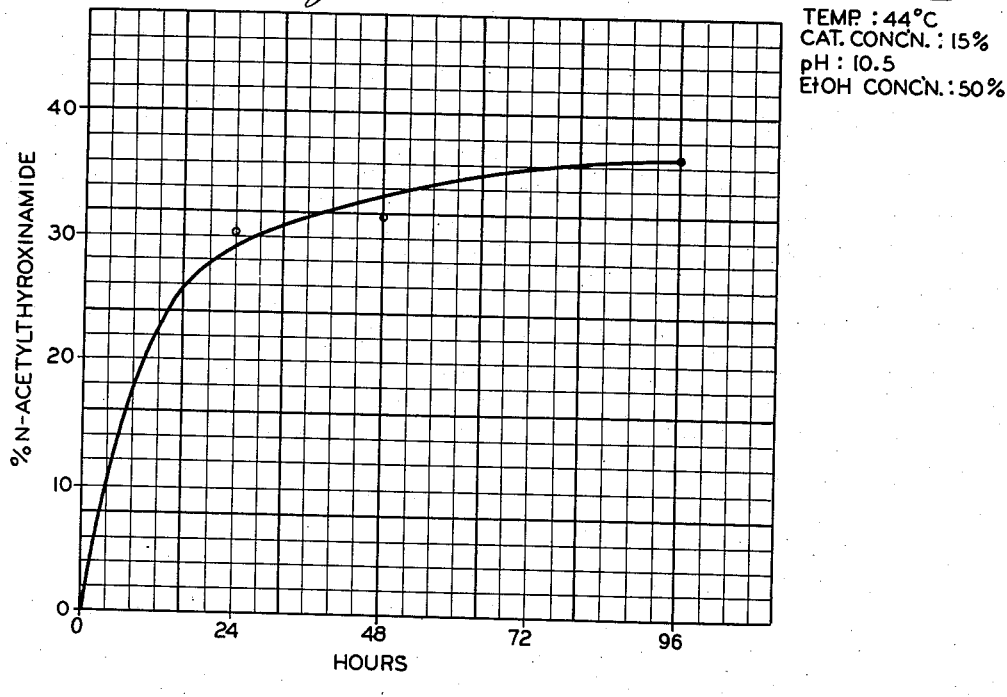

United States Patent Office 2,889,364
Patented June 2, 1959

2,889,364

PROCESS FOR PRODUCING THYROXINE

Paul Z. Anthony, Morton Grove, and Leonard G. Ginger, Skokie, Ill., assignors to Baxter Laboratories, Inc.

Application May 3, 1957, Serial No. 656,982

6 Claims. (Cl. 260—519)

This invention relates to a process for producing amides of N-acylthyroxine, and more particularly, to a process by which high yields of substantially pure, biologically active L-thyroxine can be obtained from amides of N-acyl-L-diiodotyrosine. The invention provides for the preparation of this important hormone which is used in treating such human ailments as myxedema, cretinism, obesity, etc., in such quantity as to supplement and perhaps eventually replace currently used crude, biologically-variable desiccated thyroid tissue.

This invention is related to the following commonly-assigned co-pending applications, Serial Nos. 517,794, filed June 24, 1955 (now Patent No. 2,803,654) and 552,015 filed December 9, 1055, in which the existing art in the so-called "digestive coupling reaction" (whereby diiodotyrosine yields thyroxine) was very substantially improved by the incorporation of novel preparative steps.

We have made the novel observation that blocking of the carboxyl group in the diiodotyrosine derivative by amidation with ammonia or an alkyl-amine in addition to a blocking of the amino group by an acyl substituent provides for substantially increased yields in the digestive coupling reaction. For example, it was demonstrated in Serial No. 517,794 (now Patent No. 2,803,654), that when the diiodotyrosine derivative containing an acyl substituent, but no blocking group on the carboxyl group, is digested under optimal coupling conditions, the yield is improved over the prior art of approximately 3-4% to approximately 15%. The present invention provides the unexpected finding that blocking of the carboxyl group by amidation with ammonia or an alkyl-amine in addition to the acyl blockade on the amino group, improves the obtainable yield to a range of 30-40%.

There is considerable confusion in this field concerning expression of yield. Many investigators have determined the percentage yield in the digestive coupling reaction by subtracting the amount of recoverable diiodotyrosine or a derivative thereof from the starting amount and have assumed that the difference represents the diiodotyrosine or derivative thereof capable of entering into the digestive coupling reaction. In actuality, the yield should be based on the initial amount of diiodotyrosine or derivative thereof employed. All yields specified in our invention described herein will be in terms of the latter manner of yield computation.

An object of the present invention is to provide a process for the production of amides of N-acylthyroxine in which the time period required is substantially reduced in comparison to prior art processes, at the same time producing a superior yield. A further object is to provide a process in which the digestive coupling reaction in which amides of N-acyldiiodotyrosine yield amides of N-acylthyroxine in a greatly reduced time through the use of novel and optimal catalyst concentration, pH range, alcohol concentration and reaction temperatures. A still further object is to provide an improved process for the preparation of thyroxine from amides of N-acyl-diiodotyrosine through a novel combination of steps, greatly increasing the yield within a minimum period of time. Other specific objects and advantages will appear as the specification proceeds.

Certain phases of the invention are illustrated in the accompanying drawings in which:

Figure 1 is a graph showing by a curve the percent of yield of N-acetylthyroxinamide under different catalyst concentrations;

Figure 2 is a similar graph indicating by a curve the percent yield of N-acetylthyroxinamide under different pH values;

Figure 5 is a graph indicating by a curve the percent yield of N-acetylthyroxinamide under different reaction times.

Figure 3:
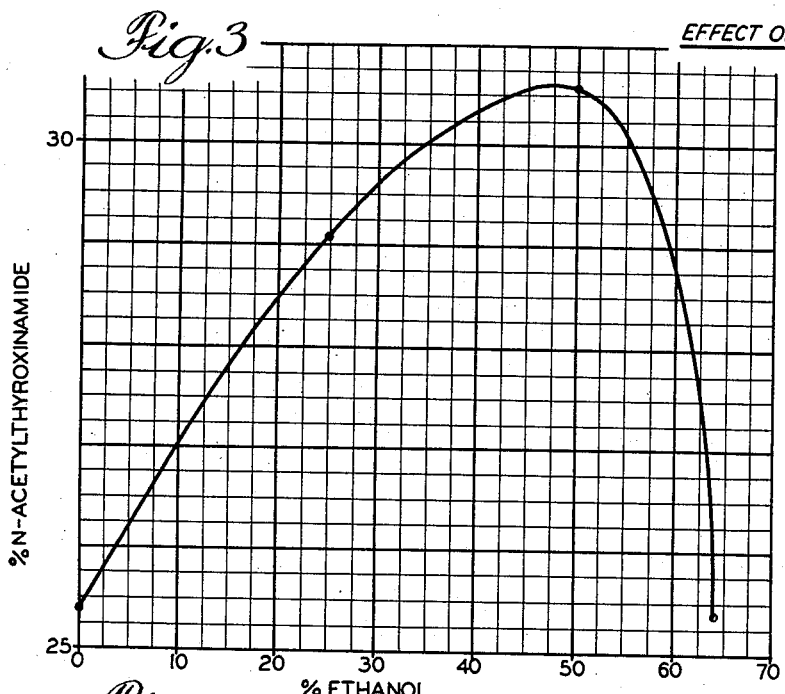
Figure 3 is a similar graph illustrating by a curve the percent yield of N-acetylthyroxinamide under different ethanol concentrations.

In one embodiment of our invention, an amide of N-acyldiiodotyrosine is suspended in a boric acid solution containing up to 65% of a lower alkanol and the solid dissolved, preferably by adjusting the pH to about 7.5 to 11.5 with sodium hydroxide. Between 0.5 and 20% (by weight) of a catalyst, such as manganese sulfate, manganese oxide, or other salts of manganese, is added, and the solution heated to about 28 to 79° C. under conditions of oxygenation for a period of approximately 24 hours. After this period of time, the N-acylthyroxinamide, which has precipitated, is collected. Subsequent acidic hydrolysis of this product of the digestive coupling reaction yields thyroxine.

The economic importance and other advantages of reducing the time period to approximately 24 hours, as realized by our process, are obvious. Further, the process described, in which optimal digestive coupling conditions are maintained, gives exceedingly high and consistent yields of 30-40%. Thus, the process affords a practicable method for the production of the pure, biologically-active hormone, thyroxine, in yields which are commercially feasible.

The digestive coupling step of our process can be expressed in terms of the following equation, wherein $R_1$ is an acyl radical and $R_2$ is an amino group or a substituted amino group:

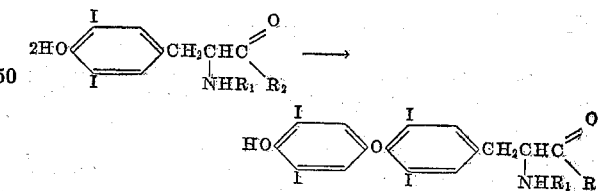

In the subsequent hydrolysis step, the acyl radical ($R_1$), is replaced by hydrogen and $R_2$ is replaced by OH.

The process of this invention provides an excellent method for the preparation of the optical isomers of thyroxine. When L-thyroxine is desired, the starting material is an amide of N-acyl-L-diiodotyrosine; when D-thyroxine is desired, the starting material is an amide of N-acyl-D-diiodotyrosine; and, when DL-thyroxine is desired, the starting material is an amide of N-acyl-DL-diiodotyrosine.

In Table I are collected the results of experiments in which the digestive coupling reaction in a borate buffer solution containing ethanol at a concentration of 50% was carried out under conditions of oxygenation at a temperature of 44° C. and a pH of 10.5 to establish the effect of catalyst concentration on the course of the reaction.

TABLE I
Effect of catalyst concentration

| Experiment No. | Catalyst, Percent MnSO₄.H₂O (by weight) | Percent N-acetylthyroxinamide (at 24 hrs.) |
| --- | --- | --- |
| 1 | 0 | 5.8 |
| 2 | 2 | 10.8 |
| 3 | 15 | 30.6 |

In Table II are presented the results of experiments on the digestive coupling reaction involving the amide of N-acetyldiiodotyrosine carried out in a borate buffer solution containing ethanol at a concentration of 50%, at a temperature of 44° C., and an optimal catalyst concentration of 15% under conditions of oxygenation to establish the effect of pH.

TABLE II
Effect of pH variation

| Experiment No. | pH | Percent N-acetyl-thyroxinamide (at 24 hours) |
| --- | --- | --- |
| 4 | 7.5 | 2.3 |
| 5 | 8.5 | 16.1 |
| 6 | 9.4 | 30.1 |
| 7 | 10.5 | 30.6 |

In Table III are presented the results of experiments involving the digestive coupling of the amide of N-acetyldiiodotyrosine in a borate buffer solution at a pH of 10.5 (within the optimal range), a temperature of 44° C., and an optimal catalyst concentration of 15% under conditions of oxygenation to establish the effect of ethanol concentration.

TABLE III
Effect of EtOH concentration

| Experiment No. | Percent EtOH | Percent N-acetyl-thyroxinamide (at 24 hours) |
| --- | --- | --- |
| 8 | 0 | 25.4 |
| 9 | 25 | 29.1 |
| 10 | 50 | 30.6 |
| 11 | 64 | 25.4 |

Table IV is a summary of experiments involving the digestive coupling of the amide of N-acetyldiiodotyrosine in a borate buffer solution at a pH of 10.5, an ethanol concentration of 50%, a catalyst concentration of 15%, and under conditions of oxygenation to establish the effect of temperature on the reaction.

TABLE IV
Effect of temperature

| Experiment No. | Temperature, ° C. | Percent N-acetyl-thyroxinamide (at 24 hours) |
| --- | --- | --- |
| 12 | 29 | 7.6 |
| 13 | 44 | 30.6 |
| 14 | 80 | 3.3 |

It was of importance to determine whether, under optimal coupling conditions, the superiority of oxygenation over aeration would persist. The yields illustrated in Table V show that oxygenation gives superior results.

TABLE V
Comparison of aeration and oxygenation

| Experiment No. | Experimental conditions | Percent N-acetyl-thyroxinamide [1] |
| --- | --- | --- |
| 15 | Aeration | 4.8 |
| 16 | Oxygenation | 30.6 |

[1] 24 hrs. at 44° C., pH 10.5, ethanol concentration 50%, and catalyst concentration of 15%.

In Table VI are collected the results of experiments involving the digestive coupling of the amide of N-acetyldiiodotyrosine in a borate buffer solution under the above-derived conditions of pH, catalyst concentration and ethanol concentration and at a temperature of 44° C. under conditions of oxygenation so as to appraise the time dependence of the reaction.

TABLE VI
Effect of time

| Experiment No. | Time, hours | Percent N-acetyl-thyroxinamide |
| --- | --- | --- |
| 17 | 24 | 30.6 |
| 18 | 48 | 31.5 |
| 19 | 96 | 36.8 |

It can be seen from Figure 1 and Table I that a good yield is obtained when the catalyst (manganese sulfate monohydrate) concentration is in the range of 0.5–20%. Better yields are obtainable when the range of catalyst concentration is 2–15%.

In our process for obtaining N-acylthyroxinamide and subsequently thyroxine itself, the importance of pH was observed. Figure 2 and Table II disclose that a pH range of 7.5 to 11.5 is desirable but that superior results are obtained in the range of 9.0 to 11.0.

We have also made the novel observation in the digestive coupling reaction involving N-acyldiiodotyrosinamide that alcohol concentration markedly influences the course of the reaction. Figure 3 and Table III reveal that when the ethanol concentration is in the range of 0 to 65%, good yields can be obtained, but for superior yields, it is desirable to operate in the ethanol concentration range of 20–60%.

Figure 4:
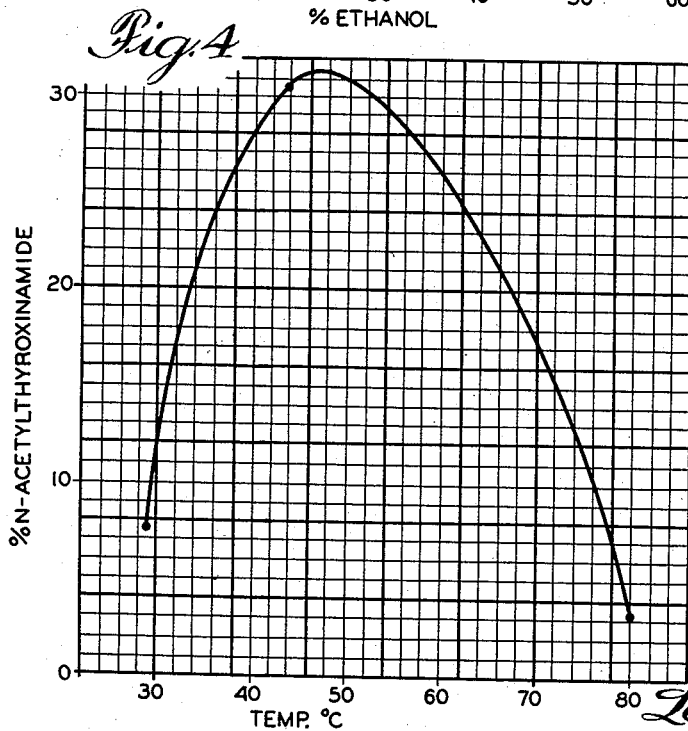
Figure 4 is a similar graph illustrating by a curve the percent yield of N-acetylthyroxinamide under different temperature conditions.

The importance of the temperature at which the digestive coupling reaction involving N-acyldiiodotyrosinamide is carried out is shown above, in Figure 4 and Table IV. When the reaction temperature is in the range of 27 to 80° C., good yields can be obtained, but for improved yields, it is desirable to operate within the temperature range of 35 to 67° C.

When all of these above-described conditions are combined and the course of the reaction is extended for periods up to 96 hours, we have observed, and this is demonstrated in Figure 5 and Table VI, that superior yields are obtained rapidly. For example, within 12 hours the yield is about 20%. However, to attain even higher yields, it is desirable to carry out the reaction for a period of approximately 24 hours, at which point the yield curve approaches a plateau which is sustained for periods up to 96 hours.

In various experiments, using amides of N-acyldiiodotyrosine other than N-acetyldiiodotyrosinamide, we have found that excellent yields of the amide of N-acylthyroxine are achieved when employing the above-described conditions. The specific acyl variants included were acetyl, propionyl and butyryl, and the nitrogen bases used in forming the amido group were ammonia and diethylamine. In Table VII are summarized the results of such studies and the yields of N-acylthyroxinamides obtained.

TABLE VII

Coupling of various amides of N-acyldiiodotyrosine[1]

| Experiment No. | $R_1$ | $R_2$ | Percent N-acyl-thyroxin-amide (at 24 hours) |
|---|---|---|---|
| 20 | Acetyl | $NH_2$ | 30.6 |
| 21 | do | $N(C_2H_5)_2$ | 20.5 |
| 22 | Propionyl | $NH_2$ | 27.3 |
| 23 | Butyryl | $N(C_2H_5)_2$ | 16.0 |

[1] At 44° C., pH 10.5, 15% $MnSO_4.H_2O$, and 50% EtOH with oxygenation.

Using our process, substantial modifications can be made in the nature of the N-acyl group. The function of this carboxylic acid radical is to remain firmly attached to the amino nitrogen atom during the incubation step so as to provide for the attainment of the superior yield, characteristic of our invention, in a substantially reduced time period in comparison with prior art processes. The substituent must also lend itself to hydrolytic removal subsequent to the incubation step. These demands are met by acyl groups derived, for example, from the straight-chain alkane carboxylic acids, branched-chain alkane carboxylic acids, cyclic alkane carboxylic acids, acids in these classes having substituents along the chain or on the ring, aromatic (including polycyclic and heterocyclic) carboxylic acids, aromatic (including polycyclic and heterocyclic) carboxylic acids having substituents on the ring(s), and carboxylic acids involving combinations of aliphatic, alicyclic and aromatic (including polycyclic and heterocyclic) types.

It is to be noted that the amide group must lend itself to hydrolytic removal subsequent to the incubation step. Substantial modifications can be made insofar as selection of the amino moiety for incorporation into the amido function is concerned. The requirements are met, for example, by substituted amines in which the substituents are straight-chain alkanes, branched-chain alkanes, alicyclic alkanes, alkanes in these classes having substituents along the chain or on the ring, aromatic hydrocarbons (including polycyclics and heterocyclics) aromatic hydrocarbons (including polycyclics and heterocyclics) having substituents on the ring(s), and hydrocarbons involving combinations of aliphatic, alicyclic and aromatic (including polycyclic and heterocyclic) types.

Specific examples of our process are set out as follows:

EXAMPLE I

A 9.30 g. portion of N-acetyl-L-diiodotyrosinamide was suspended in 100 ml. of 0.05 M boric acid ($H_3BO_3$) and 100 ml. of 95% ethanol, and the solid was dissolved by adjusting the pH to 10.5 with 2N sodium hydroxide (NaOH). A 15% (by weight) portion of manganese sulfate monohydrate was added and the solution heated at 44° C. under conditions of oxygenation while being agitated mechanically. After approximately 24 hours of incubation, the precipitated product was collected and separated from the catalyst, providing the amide of N-acetyl-L-thyroxine in 30.6% yield. On hydrolysis (removal of both amide functions), achieved by refluxing in glacial acetic acid-hydrochloric acid (approximately 2:1), L-thyroxine is obtained. It was isolated as the sodium salt, containing approximately 5 molecules of water of hydration. Analysis of a representative material gave the following values: moisture, 9.02%; specific rotation, −5.4°; iodine, 62.9% (anhydrous); and nitrogen, 1.72% (anhydrous).

EXAMPLE II

A 10.41 g. portion of N',N'-diethylamide of N-acetyl-L-diiodotyrosine was suspended in 100 ml. of 0.05 M boric acid ($H_3BO_3$) and 100 ml. of 95% ethanol, and the solid was dissolved by adjusting the pH to 10.5 with 2 N sodium hydroxide (NaOH). A 15% (by weight) portion of manganese sulfate monohydrate was added and the solution heated at 44° C. under conditions of oxygenation while being agitated mechanically. After approximately 24 hours of incubation, the precipitated product was collected and separated from the catalyst, providing the diethylamide of N-acetyl-L-thyroxine in 20.5% yield. On hydrolysis (removal of both amide functions), achieved by refluxing in glacial acetic acid-hydrochloric acid (approximately 2:1), L-thyroxine was obtained. It was isolated as the sodium salt, containing approximately 5 molecules of water of hydration.

EXAMPLE III

A 10.97 g. portion of N',N'-diethylamide of N-butyryl-L-diiodotyrosine was suspended in 100 ml. of 0.05 M boric acid ($H_3BO_3$) and 100 ml. of 95% ethanol, and the solid was dissolved by adjusting the pH to 10.5 with 2 N sodium hydroxide (NaOH). A 15% (by weight) portion of manganese sulfate monohydrate was added and the solution heated at 44° C. under conditions of oxygenation while being agitated mechanically. After approximately 24 hours of incubation, the precipitated product was collected and separated from the catalyst providing the diethylamide of N-butyryl-L-thyroxine in 16% yield. On hydrolysis (cleavage of both amide function), achieved by refluxing in glacial acetic acid-hydrochloric acid (approximately 2:1), L-thyroxine was obtained. It was isolated as the sodium salt, containing approximately 5 molecules of water of hydration.

While in the foregoing specification, we have set forth specific examples of the process in considerable detail for the purpose of illustrating embodiments of the invention, it will be understood that such details may be varied widely by those skilled in the art without departing from the spirit of our invention.

We claim:

1. A process for the production of thyroxine comprising the steps of incubating an amide of N-acyldiiodotyrosine in an aqueous solution containing about 50% ethanol and having a pH of about 10.5 in the presence of about 15% by weight of a manganese-containing catalyst while passing substantially pure oxygen through the solution and while maintaining a temperature of about 44° C., the amido nitrogen substituents of said amide being members selected from the class consisting of hydrogen and the lower alkanes, and the acyl portion of said N-acyldiiodotyrosine being derived from one of the lower alkanoic acids, and hydrolytically cleaving both the amide portion and the said acyl portion from the N-acylthyroxinamide derivative obtained in said incubation step.

2. In the process for the production of thyroxine from an amide of N-acyldiiodotyrosine wherein the amide of N-acyldiiodotyrosine is incubated in an alkaline aqueous solution of a lower alkanol at a pH and temperature favoring conversion of the amide of N-acyldiiodotyrosine to N-acylthyroxine, the improvement comprising carrying out said incubation for a period of about 96 hours in the presence of about 0.5% to 20% by weight based on the weight of the amide of N-acyldiiodotyrosine, of a manganese-containing catalyst for said conversion, and passing substantially pure oxygen through said aqueous solution during said conversion, and thereafter hydrolytically cleaving the amine moiety from the carboxy amide and the acyl moiety from the amino group of the amide of N-acylthyroxine resulting from said incubation.

3. In a process for producing thyroxine, the steps of blockading the amino group of diiodotyrosine with an acyl group and the carboxyl group with an amine group to provide an amide of N-acyldiiodotyrosine, incubating the said amide of N-acyldiiodotyrosine in an alkaline aqueous solution of a lower alkanol having a pH in the range 7.5 to 11.5 in the presence of between about 0.5% to about 20% of a manganese-containing catalyst while passing substantially pure oxygen through the solution and while maintaining the temperature in the range of 28° to 79° C., and thereafter hydrolytically cleaving the blockading groups from the resultant amide of N-acyl-thyroxine.

4. The method of claim 3 in which the said incubation is carried out at a pH of about 9.0 to 11.0 in the presence of about 2% to 15% of the manganese-containing catalyst and at a temperature in the range of 35° to 65° C., the aqueous solution of the lower alkanol comprising about 20% to 60% ethanol.

5. The method of claim 3 in which the said acyl group which provides a blockade for the amino group is derived from a lower alkanoic acid and the said amine moiety which provides a blockade for the carboxyl group is a member selected from the class consisting of ammonia, a lower alkyl mono-substituted amine, and a lower alkyl disubstituted amine.

6. In a process for the production of thyroxine, the steps of blockading the carboxyl and the amino groups of diiodotyrosine with an amino group and an acyl group, respectively, incubating the resultant amide of N-acyldi-iodotyrosine in an alkaline aqueous solution of a lower alkanol and in the presence of a manganese-containing catalyst while passing substantially pure oxygen through the solution, and thereafter regenerating the carboxyl and amino groups from the resultant amide of N-acyl-thyroxine by hydrolysis of the blocking groups.

References Cited in the file of this patent

UNITED STATES PATENTS 2,803,654     Anthony et al.  ---------- Aug. 20, 1957

OTHER REFERENCES

Rivers: Chem. Absts., vol. 42, p. 4142 (1948).